United States Patent
Kim et al.

(10) Patent No.: US 10,364,155 B2
(45) Date of Patent: Jul. 30, 2019

(54) METHOD OF REMOVING HYDROUS SILICA FROM BENTONITE

(71) Applicant: KOREA INSTITUTE OF GEOSCIENCE AND MINERAL RESOURCES, Daejeon (KR)

(72) Inventors: Wan-Tae Kim, Daejeon (KR); Sang-Bae Kim, Daejeon (KR); Il-Mo Kang, Seoul (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 609 days.

(21) Appl. No.: 14/983,255

(22) Filed: Dec. 29, 2015

(65) Prior Publication Data

US 2016/0185608 A1    Jun. 30, 2016

(30) Foreign Application Priority Data

Dec. 30, 2014   (KR) .................. 10-2014-0192967

(51) Int. Cl.
    *C01B 33/26*   (2006.01)
(52) U.S. Cl.
    CPC .................. *C01B 33/26* (2013.01)
(58) Field of Classification Search
    None
    See application file for complete search history.

(56) References Cited

U.S. PATENT DOCUMENTS 4,483,934 A * 11/1984 Goodman ............. C01B 33/26
                                                    106/DIG. 4

2014/0377562 A1 * 12/2014 Toro Estay ............. C08K 9/04
                                                    428/402

FOREIGN PATENT DOCUMENTS

| CN | 103663481 A | * | 3/2014 |
| CN | 103663481 A |   | 3/2014 |
| CN | 103848430 A |   | 6/2014 |
| JP | 58-204862 A |   | 11/1983 |
| JP | 9-183613 A  |   | 7/1997 |
| JP | 2011-207687 A |  | 10/2011 |
| KR | 2001-0079473 |   | 8/2001 |
| KR | 10-0420501 B1 |  | 3/2004 |
| KR | 10-2010-0012725 | | 2/2010 |
| KR | 10-2010-0021542 | | 2/2010 |

OTHER PUBLICATIONS

Chinese Office action with English translation for Application No. 201511017521.9, dated May 2, 2017, 17 pages.
Rasin, et al., "Study on the activation of Qara Tappah Iraqi bentonite and its test as gelling agent," International Journal of Application or Innovation in Engineering and Management, vol. 2, Issue 1. Jan. 2013, pp. 1-4.
Japanese Office action with English Translation for Application No. 2015-254608, dated Feb. 7, 2017, 8 pages.

* cited by examiner

*Primary Examiner* — Melissa S Swain
(74) *Attorney, Agent, or Firm* — Lewis Roca Rothgerger Christie LLP

(57) ABSTRACT

A method of removing hydrous silica from bentonite includes irradiating an ultrasonic wave after preparing slurry by putting the bentonite and a sodium compound into distilled water or deionized water, adding the distilled water or the deionized water to the slurry, into which the ultrasonic wave is irradiated, to dilute and centrifugate the slurry, and drying a supernatant obtained through the centrifugation.

14 Claims, 7 Drawing Sheets

METHOD OF REMOVING HYDROUS SILICA FROM BENTONITE

CROSS-REFERENCE TO RELATED APPLICATION

This application claims the benefit of Korean Patent Application No. 10-2014-0192967, filed on Dec. 30, 2014 in the Korean Intellectual Property Office, the entirety of which is incorporated herein by reference.

BACKGROUND OF THE INVENTION

1. Field of the Invention

The present invention relates to a method of removing hydrous silica from bentonite by employing a sodium compound and the irradiation of an ultrasonic wave.

2. Description of the Related Art

Since the bentonite has properties more excellent than those of other minerals in a cation exchange capacity, a caking ability, hydration, and swellability, the bentonite has been used as a binder in a casting industry using a caking property, a civil engineering work material using the swellability, or pesticide additives. Recently, the bentonite has been spotlighted as organic-inorganic nano-composites. In addition, the bentonite shows an increasing trend of the demand in chemical industrial fields including paper, paint, water treatment, and polymer industry which are novel uses based on mineralogical properties of the montmorillonite contained in the bentonite. In order to use the bentonite, the montmorillonite contained in the bentonite is selectively and essentially separated and recovered from the bentonite.

Meanwhile, since a natural bentonite material contains quartz, zeolite, micas, kaolinite, illite, gypsum, or calcite as impurity minerals in addition to montmorillonite which is a main component, the impurity minerals serve as various limitations when the bentonite is used. In addition, impurity minerals intercalated into the bentonite mineral are variously structured depending on the type of a geological change, which is applied to the bentonite mineral in the time of creation of the bentonite mineral, and surrounding mineral environments. In addition, the particle size of a main bentonite mineral, which has the property of a clay mineral in fine particle size, varies depending on the type of surrounding minerals, and the type, the mixing degree, and the distribution characteristic of surrounding impurities.

As schemes to separately select the montmorillonite mineral among bentonites, there are a screening separation scheme to make an ore solution by adding water to bentonite ore, to scrub the ore solution in an agitator by the rotational force of an impeller, and to make the ore solution pass through a sieve having a predetermined size to recover fine particle products, a levigation scheme to mix the bentonite ore with water, to agitate the mixture, to carry floating products into a water stream, and to recover the floating products, and a cyclone scheme to make the ore solution pass through a cyclone to recover only the fine particle product. However, even though the above methods have effects of separately selecting the montmorillonite contained in the bentonite, the montmorillonite mineral is recovered at a lower recovery rate, and only the pure montmorillonite may be hardly recovered. Since the scrubbing process requires a great amount of time and energy, and the separation process requires a great amount to be added, the dehydration and the post-treatment processes are complicated, so that the process cost may be increased.

When the bentonite having a main component as montmorillonite is applied to a human body through cosmetics, foods, or medicines, many diseases, such as cancer, may be caused due to hydrous silica contained in montmorillonite. Accordingly, a method of removing the hydrous silica contained in the bentonite is required.

As a prior art, there is disclosed Korean Unexamined Patent Publication No. 10-2001-0079473 (published on Aug. 22, 2001) entitled "Bentonite (or montmorillonite) Containing Numerous Types of Colloidal Trace Minerals".

SUMMARY OF THE INVENTION

The present invention relates to a method of simply removing hydrous silica from bentonite through a sodium compound and the irradiation of an ultrasonic wave.

The objects of the present invention are not limited to the above-mentioned objects, and other objects will be clearly understood from the following description by those skilled in the art.

In order to accomplish the objects, there is provided a method of removing hydrous silica from bentonite, which includes irradiating an ultrasonic wave after preparing slurry by putting the bentonite and a sodium compound into distilled water or deionized water, adding the distilled water or the deionized water to the slurry, into which the ultrasonic wave is irradiated, to dilute and centrifugate the slurry, and drying a supernatant obtained through the centrifugation.

There is provided a method of removing hydrous silica from bentonite, which includes performing pretreatment with respect to the bentonite, irradiating an ultrasonic wave after adding a sodium compound into the bentonite subject to the pretreatment and putting a result into distilled water or deionized water, adding the distilled water or the deionized water to the slurry, into which the ultrasonic wave is irradiated, to dilute the slurry and centrifugate the slurry, and drying a supernatant obtained through the centrifugation.

As described above, according to the present invention, when montmorillonite, which a main component of bentonite, is applied to a human body through cosmetics, foods, or medicines, many diseases, such as cancer, can be caused due to hydrous silica contained in montmorillonite. Accordingly, Ca-bentonite can be activated to Na-bentonite using a sodium compound, thereby exposing mineral impurities, such as the hydrous silica, existing between sheet structures to the particle surface of the bentonite.

In addition, the montmorillonite can be separated from the bentonite by irradiating an ultrasonic wave to the bentonite and then centrifugation is performed with respect to the montmorillonite to remove 95-100% of hydrous silica, which is advantageous to cosmetics, foods, or medicines.

DETAILED DESCRIPTION OF THE INVENTION

An exemplary embodiment of the present invention will be described in detail with reference to accompanying drawings.

The advantages, the features, and schemes of achieving the advantages and features will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention.

In addition, the detailed descriptions of well-known techniques incorporated herein may be omitted when they make the subject matter rather unclear.

The present invention provides a method of removing hydrous silica from bentonite, which includes the steps of irradiating an ultrasonic wave after preparing slurry by putting bentonite and a sodium compound into distilled water or deionized water, adding the distilled water or the deionized water to the slurry, into which the ultrasonic wave is irradiated, to dilute and centrifuge the slurry, and drying a supernatant obtained through the centrifugation.

Figure 1:
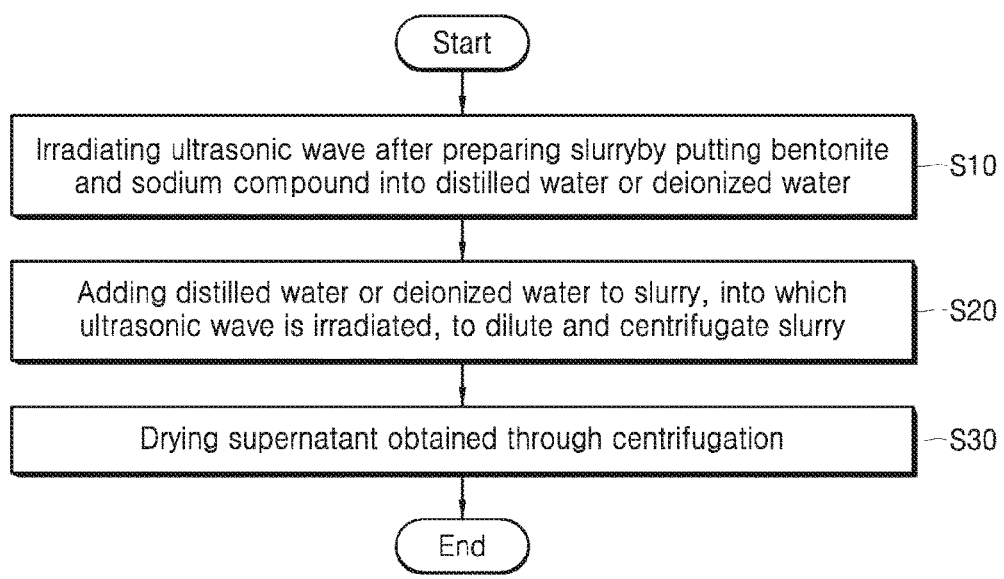
FIG. 1 is a flowchart showing the method of removing the hydrous silica from the bentonite.

According to the method of removing hydrous silica from bentonite of the present invention, when montmorillonite, which is a main component of bentonite, is applied to a human body through cosmetics, foods, or medicines, many diseases, such as cancer, may be caused due to hydrous silica contained in montmorillonite. Accordingly, Ca-bentonite is activated to Na-bentonite using a sodium compound, thereby exposing mineral impurities, such as the hydrous silica, existing between sheet structures to the particle surface of the bentonite. In addition, the montmorillonite is separated from the bentonite by irradiating an ultrasonic wave to the bentonite and then centrifugation is performed with respect to the montmorillonite to remove 95-100% of hydrous silica, which is advantageous to cosmetics, foods, or medicines FIG. 1 is a flowchart showing the method of removing the hydrous silica from the bentonite. Hereinafter, the present invention will be described in detail with reference to FIG. 1.

The method of removing the hydrous silica from the bentonite includes step (S10) of irradiating an ultrasonic wave after preparing the slurry by putting the bentonite and a sodium compound into distilled water or deionized water.

Preferably, the bentonite is contained in the distilled water or the deionized water so that the concentration of the bentonite becomes in the range of 3.0 wt % to 9.0 wt %. If the concentration of the bentonite is less than 3.0 wt %, the collision between particles of the bentonite and bubbles made by the ultrasonic wave or the collision between particles of the bentonite is reduced when the ultrasonic wave is irradiated, so that the hydrous silica may be less separated from the bentonite. Accordingly, an amount of high-purity bentonite may be less obtained in the final stage. If the concentration of the bentonite exceeds 9.0 wt %, the fluidity of the slurry is remarkably degraded, so that the effect of the ultrasonic waves may be lowered thereafter.

In addition, the sodium compound may include one selected from the group consisting of $Na_2CO_3$, $NaHCO_3$ and $(NaPO_3)_6$. According to the present invention, Ca-bentonite may be activated to Na-bentonite using the above sodium compound, and hydrous silica distributed between bentonite layers may be effectively removed using improved swellability of the Na-bentonite.

If the sodium compound is contained at more than 90% of a CEC value of the bentonite as recognized in following experimental example 1, the position of the XRD peak may not be varied, and a d-spacing may be constantly maintained. Accordingly, a proper amount of sodium compound to be added is obtained by converting the d-spacing. Accordingly, the sodium compound is preferably added at weight ratio of 0.04 to 0.09 with respect to the bentonite. In detail, when the sodium compound is $Na_2CO_3$, the sodium compound is added at the weight ratio of 0.04 to 0.05 with respect to the bentonite. When the sodium compound is $NaHCO_3$, the sodium compound is added at the weight ratio of 0.06 to 0.07 with respect to the bentonite. When the sodium compound is $(NaPO_3)_6$, the sodium compound is added at the weight ratio of 0.07 to 0.09 with respect to the bentonite. If the weight ratio is less than 0.04, Ca between the bentonite layers is not completely substituted into Na, so that the swellability may be degraded. Accordingly, the hydrous silica between the layers may not be sufficiently exposed to the outside. If the weight ratio exceeds 0.09, an amount of sodium compounds to be added may be increased, so that extra Na may remain in the final product.

In addition, the ultrasonic wave is preferably irradiated with the frequency of 20 kHz, and energy of 500 W to 700 W for 10 min to 20 min. If the frequency of the ultrasonic wave is less than 500 W, the efficiency of separating the hydrous silica from the bentonite may be lowered. If the frequency of the ultrasonic wave exceeds 700 W, slurry is strongly fluctuated, so that the workability may be degraded, and the energy may be excessively consumed. Accordingly, a part of generating the ultrasonic wave is easily abraded, so that impurities may be easily introduced into the slurry.

Next, the method of removing the hydrous silica from the bentonite includes step (S20) of adding the distilled water or the deionized water to the slurry, into which the ultrasonic wave is irradiated, to dilute and centrifugate the slurry.

Preferably, after the ultrasonic wave has been irradiated, the distilled water or the deionized water is added so that the concentration of the slurry is in the range of 0.75 wt % to 1.5 wt %. If the concentration of the slurry is less than 0.75 wt %, an amount of the slurry is increased, so that a centrifugal number may be increased. If the concentration of the slurry exceeds 1.5 wt %, the separation efficiency may be degraded due to the interference between particles existing in the slurry.

In addition, the centrifugation is preferably performed at 10,000 rpm to 12,000 rpm for 30 min. If the centrifugation is performed at less than 10,000 rpm, the hydrous silica may not be removed from the bentonite. If the centrifugation is performed at more than 12,000 rpm, the real yield rate of the bentonite may be reduced.

The method of removing hydrous silica from the bentonite of the present invention includes step (S30) of drying a supernatant obtained through the centrifugation.

According to the method of removing hydrous silica from the bentonite of the present invention, when the centrifugation is performed, a liquid (supernatant) is separated from a solid (precipitate), and only the montmorillonite having no hydrous silica exists in the separated supernatant. Accordingly, high-purity montmorillonite having no hydrous silica may be obtained by drying the montmorillonite.

In addition, the present invention provides a method of removing hydrous silica from bentonite, which includes the steps of performing pretreatment with respect to the bentonite, irradiating an ultrasonic wave after adding a sodium compound into the bentonite subject to the pretreatment and putting the result into distilled water or deionized water, adding the distilled water or deionized water to the slurry, into which the ultrasonic wave is irradiated, to dilute the slurry and centrifugate the slurry, and drying a supernatant obtained through the centrifugation.

Since a natural bentonite material contains silica, zeolite, micas, kaolinite, illite, gypsum, or calcite as impurity minerals in addition to montmorillonite which is a main component, pretreatment may be performed with respect to the bentonite in order to remove the impurity mineral from the bentonite. Only montmorillonite may be recovered from the bentonite by performing the pretreatment.

According to the method of removing hydrous silica from the bentonite of the present invention, the pretreatment includes a process of drying, scrubbing, and levigating, and drying the bentonite.

In this case, the bentonite subject to the pretreatment is contained in the distilled water or the deionized water so that the concentration of the bentonite is in the range of 3.0 wt % to 9.0 wt %.

In addition, the sodium compound may include one selected from the group consisting of $Na_2CO_3$, $NaHCO_3$, and $(NaPO_3)_6$. The sodium compound is preferably added at the weight ratio of 0.04 to 0.09 with respect to the bentonite subject to the pretreatment. The configuration thereof has been described.

Embodiment 1: Removal 1 of Hydrous Silica from Bentonite

After preparing 3 wt %, of slurry by putting 10.5 g of bentonite and 0.48 g of $Na_2CO_3$ into 350 ml of distilled water, an ultrasonic wave having the frequency of 20 kHz and energy of 500 W is irradiated to the result for 10 min. After the ultrasonic wave has been irradiated, the 350 ml of slurry is diluted with 1,050 ml of the distilled water so that the concentration of the slurry becomes 0.75%. Then, the diluted slurry is divided into four equal parts to be centrifugated at 4,000 rpm, 6,000 rpm, 8,000 rpm, and 10,000 rpm, respectively, for 30 min. The supernatant, which is obtained after the centrifugation has been performed, is dried to obtain high-purity montmorillonite having no hydrous silica.

Figure 2:
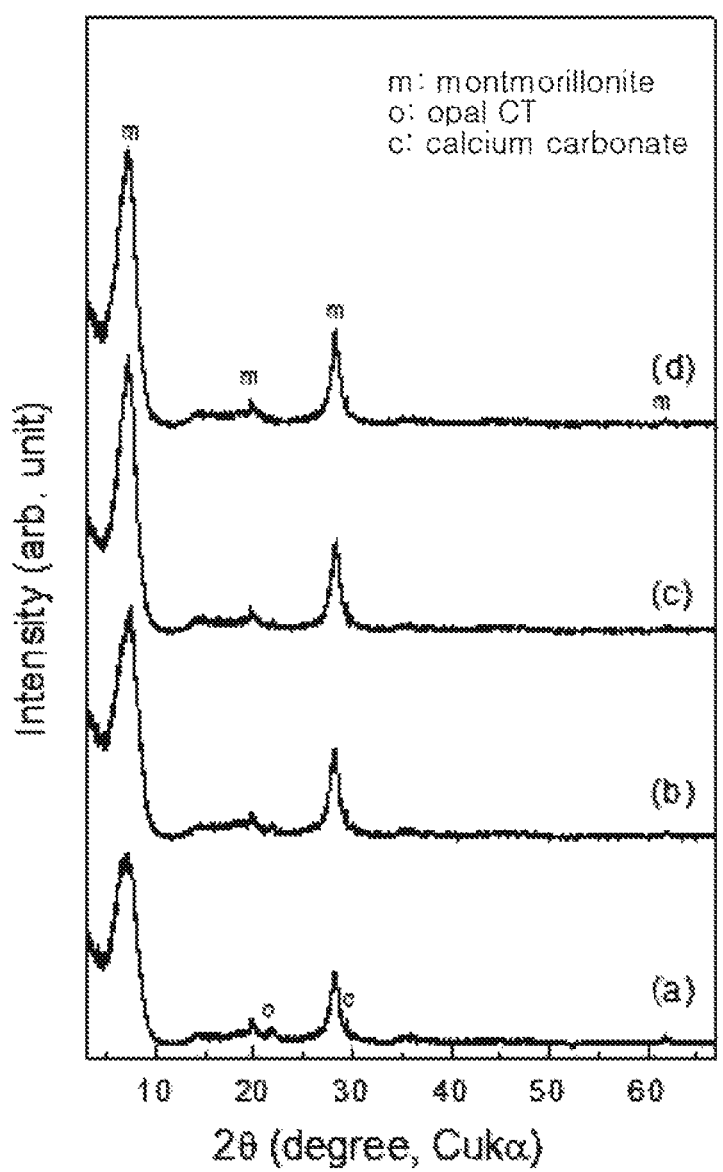
FIG. 2 is a graph showing an XRD result obtained after drying the supernatant obtained through the centrifugation in the method of removing hydrous silica from the bentonite according to the present invention.

FIG. 2 is a graph showing an XRD result obtained after drying the supernatant obtained through the centrifugation in the method of removing hydrous silica from the bentonite according to the present invention. Reference signs (a), (b), (c), and (d) of FIG. 2 represent XRD results obtained through 4,000 rpm, 6,000 rpm, 8,000 rpm, and 10,000 rpm centrifugations, respectively. As shown in FIG. 2, hydrous silica ($SiO_2.nH_2O$; opal CT) is not observed in a liquid after the 10,000 rpm centrifugation has been performed. Accordingly, it can be recognized that most parts of the slurry are precipitated when the solid-liquid separation is performed. Therefore, only the montmorillonite exists in the liquid obtained through the solid-liquid separation and through the irradiation of the ultrasonic wave with the sodium compound, so that it may be recognized that the hydrous silica is removed.

Figure 3:
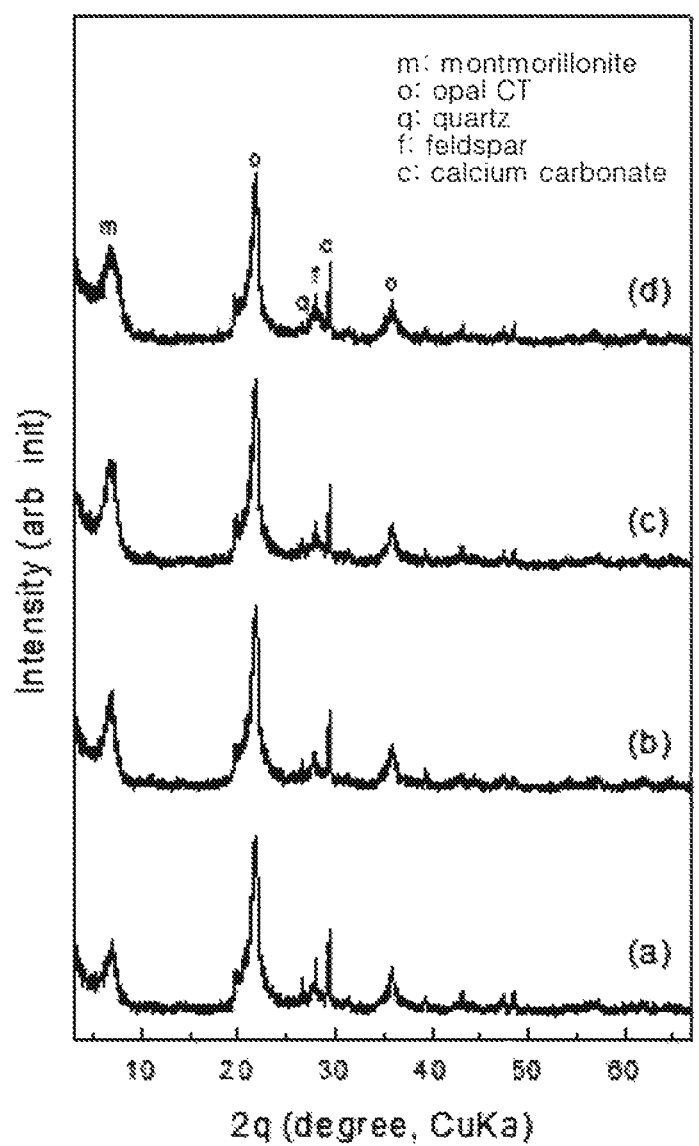
FIG. 3 is a graph showing an XRD result obtained after drying the precipitate obtained through the centrifugation in the method of removing hydrous silica from the bentonite according to the present invention.

FIG. 3 is a graph showing an XRD result obtained after drying the precipitate obtained through the centrifugation in the method of removing hydrous silica from the bentonite according to the present invention. It may be recognized from FIG. 3 that peaks of impurity minerals, such as quartz and feldspar, which are mixed in the bentonite, are shown in the precipitate in addition to the hydrous silica, and $CaCO_3$ derived from $Na_2CO_3$ is detected from the precipitate.

Embodiment 2: Removal 2 of Hydrous Silica from Bentonite

In the Embodiment 2, hydrous silica is removed from bentonite in the same manner as that of Embodiment 1 except that pretreatment is performed with respect to the bentonite by performing processes of drying, scrubbing, specific-gravity separating, and drying the bentonite.

Comparative Example 1: Treatment 1 for Bentonite

After putting 10.5 g of bentonite into 350 ml of distilled water to make slurry, the slurry is mechanically agitated for 60 min, and centrifugated at 10,000 rpm for 30 min. The liquid obtained after the centrifugation has been performed is dried.

Comparative Example 2: Treatment 2 for Bentonite

After putting 10.5 g of bentonite and 0.48 g of $Na_2CO_3$ into 350 ml of distilled water, the result is centrifugated at 10,000 rpm for 30 min. The liquid obtained after the centrifugation has been performed is dried.

Comparative Example 3: Treatment 3 for Bentonite

After putting 10.5 g of bentonite into 350 ml of distilled water, ultrasonic wave having the frequency of 20 kHz and energy of 240 W is irradiated for 10 min. Thereafter, the result is centrifugated at 10,000 rpm for 30 min. The liquid obtained after the centrifugation has been performed is dried.

Experimental Example 1: Analysis of Sodium Compound

Figure 4:
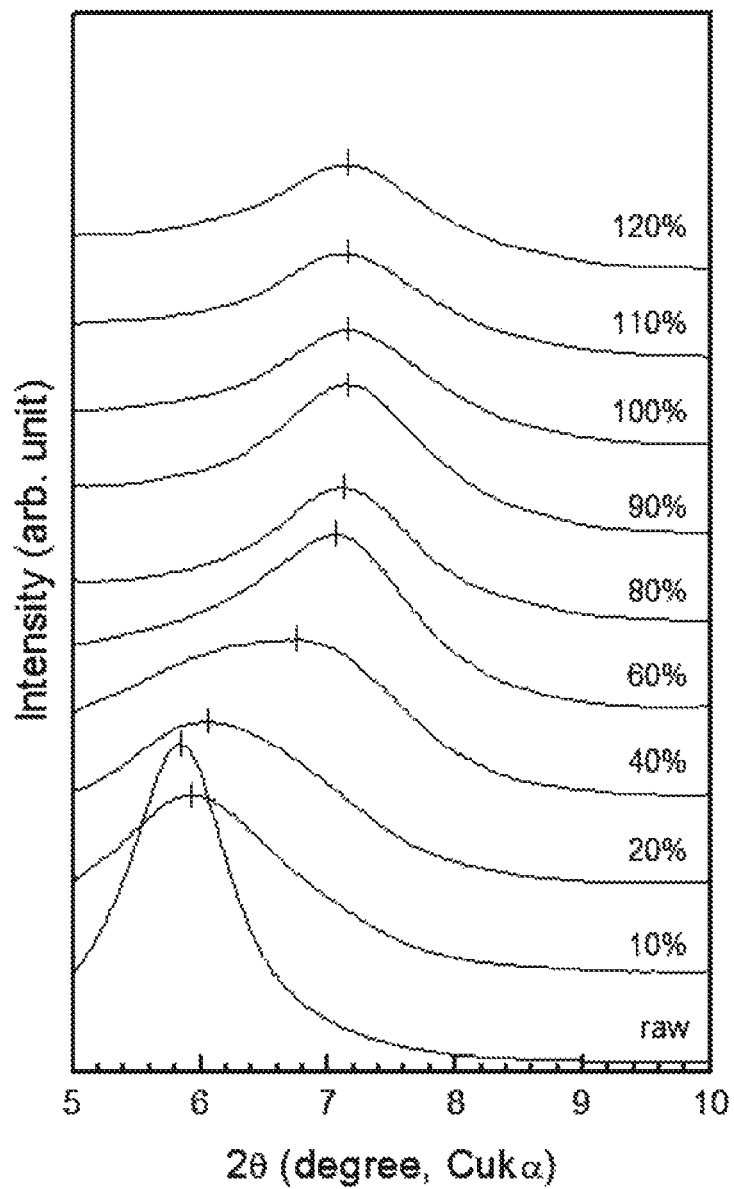
FIG. 4 illustrates XRD results according to an amount of added sodium compound in the method of removing the hydrous silica from the bentonite according to the present invention.
Figure 5:
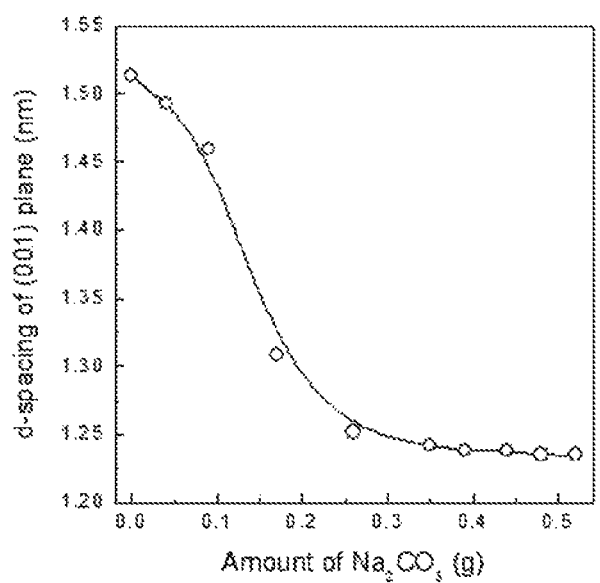
FIG. 5 is a graph showing the variation of the d-spacing of the bentonite according to the amount of the added sodium compound in the method of removing hydrous silica from the bentonite according to the present invention.

According to the method of removing hydrous silica from bentonite of the present invention, in order to determine an amount of sodium compound to be added, an XRD and the variation in a d-spacing are analyzed, and the analysis results are shown in FIGS. 4 and 5.

According to the present invention, a predetermined calculation manner is employed together with an XRD in order to add a desirable amount of sodium compound for alkali activation.

The sodium compound is introduced into the bentonite, and the result is wet-mixed at the temperature of 65° C. for one hour, and dried. Thereafter, the bentonite is analyzed through the XRD, and a theoretical amount of the sodium compound is calculated through following Equation 1.

Amount (g) of used sodium compound=(Bentonite CEC (eq/g)×Weight (g) of bentonite×Molecular weight of sodium compound)/1000×0.5  [Equation 1]

The CEC represents the cation exchange capacity (meq/100 g) of bentonite.

FIG. 4 illustrates XRD results according to an amount of added sodium compound in the method of removing the hydrous silica from the bentonite according to the present invention. It may be recognized from FIG. 4 that a peak varies depending on the amount of added sodium compound. When an amount of $Na_2CO_3$, which is sodium compound, is added by 90% or more of the bentonite CEC, the position of the peak of the XRD does not vary.

Following table 1 represents amounts of $Na_2CO_3$ corresponding to 10%, 20%, 40%, 60%, 80%, 90%, 100%, 110%, and 120% of the bentonite CEC.

TABLE 1

|  | % of CEC | | | | | | | | |
| --- | --- | --- | --- | --- | --- | --- | --- | --- | --- |
|  | 10 | 20 | 40 | 60 | 80 | 90 | 100 | 110 | 120 |
| $Na_2CO_3$ (g) | 0.04 | 0.09 | 0.17 | 0.26 | 0.35 | 0.39 | 0.44 | 0.48 | 0.52 |

In this case, an amount of used bentonite is 10.5 g, and the CEC of the bentonite is 78.4 meq/100 g.

In addition, FIG. 5 is a graph showing the variation of the d-spacing of the bentonite according to the amount of the added sodium compound in the method of removing hydrous silica from the bentonite according to the present invention. As shown in FIG. 5, as an amount of $Na_2CO_3$, which is sodium compound, is increased, a d-spacing of a (001) plane is reduced. In particular, when $Na_2CO_3$ is added by 0.4 g or more, the d-spacing is constantly maintained without variation.

Therefore, according to the method of removing the hydrous silica from the bentonite of the present invention, an amount of added sodium compound is more preferably in the range of 0.4 g to 0.5 g in which the d-spacing of the (001) plane of the bentonite is not changed.

Experimental Example 2: Adding State of Sodium Compound and Analysis of Recovery Rate of Montmorillonite According to Sonication Time by Ultrasonic Wave According to the method of removing the hydrous silica from the bentonite of the present invention, the adding state of the sodium compound and the analysis of the recovery rate of the montmorillonite according to the sonication time by the ultrasonic wave are examined and the results are shown in FIG. 6.

Figure 6:
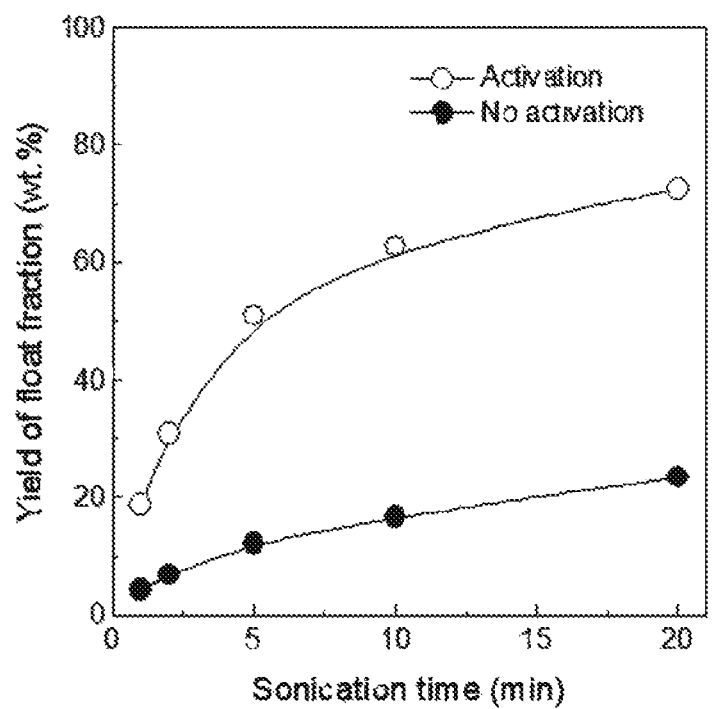
FIG. 6 is a graph showing the adding state of a sodium compound and the recovery rate of high-purity bentonite according to the sonication time of the ultrasonic wave in the method of removing hydrous silica from the bentonite according to the present invention.

It may be recognized from FIG. 6 that the recovery rate of the montmorillonite is significantly improved by adding the sodium compound. When the sonication time of the ultrasonic wave is in the range of 10 min to 20 min, the recovery rate of the montmorillonite is highly represented.

Experimental Example 3: Analysis of Recovery Rate of Bentonite According to Treatment Methods of Bentonite The recovery rate of the bentonite according to the treatment methods of the bentonite is analyzed and the analysis results are shown in table 2 and FIG. 7.

TABLE 2

| Example | Mechanical Agitation | $Na_2CO_3$ | Irradiation of ultrasonic wave | Centrifugation | Amount of Final Product (wt %) |
| --- | --- | --- | --- | --- | --- |
| Embodiment 2 | X | ○ | ○ | ○ | 61.4 |
| Comparative Example 1 | ○ | X | X | ○ | 0.5 |
| Comparative Example 2 | X | ○ | X | ○ | 24.7 |
| Comparative Example 3 | X | X | ○ | ○ | 16.5 |

Figure 7:
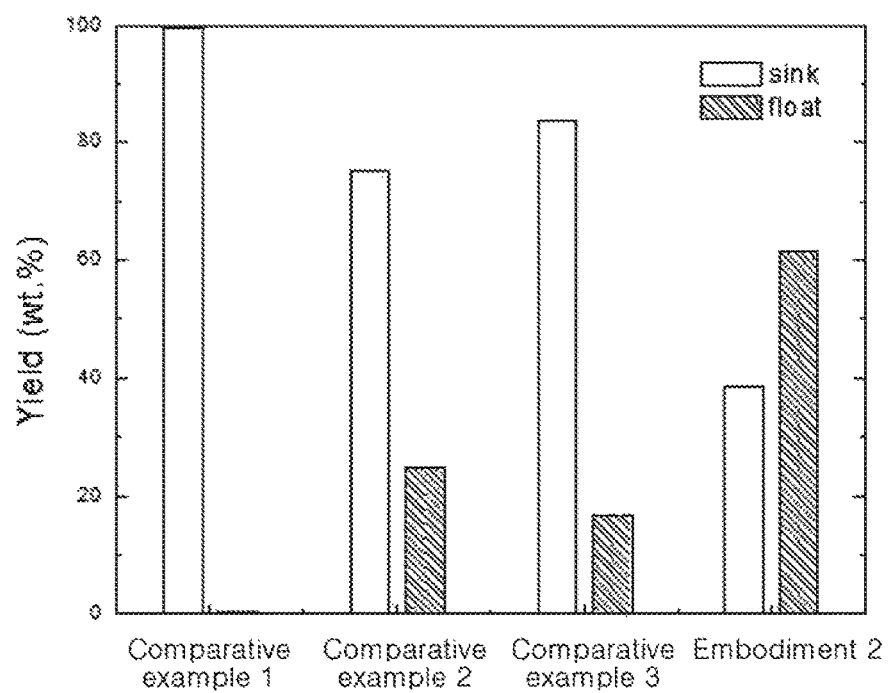
FIG. 7 is a graph showing an amount of recovered high-purity bentonite according to schemes of treating the bentonite.

As shown in table 2 and FIG. 7, in Embodiment 2 according to the present invention, high-purity bentonite (montmorillonite) having no hydrous silica can be obtained by 61.4 wt %, which represents the highest recovery rate, and bentonite having no hydrous silica is hardly obtained through the mechanical agitation and the centrifugation. In addition, even when $Na_2CO_3$ and centrifugation are employed, since an amount of the bentonite having no hydrous silica may be obtained by 24.7 wt %, and an amount of bentonite having no hydrous silica is significantly reduced when comparing with Embodiment 2 of the present invention. Further, even when the irradiation of the ultrasonic wave and the centrifugation are employed, an amount of the bentonite having no hydrous silica is represented in 16.5 wt %, which does not reach an amount of the bentonite having no hydrous silica obtained in Embodiment 2.

Accordingly, in order to remove hydrous silica from the bentonite and obtain a great amount of montmorillonite, $Na_2CO_3$, the irradiation of the ultrasonic wave, and the centrifugation must be performed together.

Although the method of removing the hydrous silica from the bentonite according to the present invention has been described, it is obvious to those skilled in the art that various modifications can be made within the scope of the present invention.

Accordingly, the scope of the present invention should not be defined by the above described embodiments, but defined by not only attached claims, but also equivalents.

In other words, it should be understood that the above-described embodiments are provided for illustrative purpose, and do not limit the present invention. In addition, the scope of the present invention is defined by attached claims rather than the detailed description, and all changes or modifications derived from the meaning, the scope, and the equivalent concept of the claims fall within the scope of the present invention.

What is claimed is:

1. A method of removing hydrous silica from bentonite, the method comprising:
   preparing a slurry by putting the bentonite and a sodium compound into distilled water or deionized water;
   ultrasonicating the slurry;
   diluting the ultrasonicated slurry by adding distilled water or deionized water;
   centrifuging the diluted slurry; and
   drying a supernatant obtained through the centrifugation,
   wherein the sodium compound is added with a weight ratio in a range of 0.04 to 0.09 with respect to the bentonite,
   the sodium compound is contained in the slurry at an amount greater than 90% of a cation exchange capacity (CEC) value (meq/100 g) of the bentonite,
   the bentonite comprises Ca-bentonite, and the Ca-bentonite is converted to Na-bentonite using the sodium compound,
   the centrifugation is performed at 10,000 rpm to 12,000 rpm for 30 min.

2. The method of claim 1, wherein the bentonite is contained in the slurry such that the bentonite has a concentration of 3.0 weight % to 9.0 weight %.

3. The method of claim 1, wherein the sodium compound includes one selected from the group consisting of $Na_2CO_3$, $NaHCO_3$ and $(NaPO_3)_6$.

4. The method of claim 1, wherein the sodium compound is added with a weight ratio in a range of 0.04 to 0.05 with respect to the bentonite when the sodium compound is $Na_2CO_3$.

5. The method of claim 1, wherein the sodium compound is added with a weight ratio in a range of 0.06 to 0.07 with respect to the bentonite when the sodium compound is $NaHCO_3$.

6. The method of claim 1, wherein the sodium compound is added with a weight ratio in a range of 0.07 to 0.09 with respect to the bentonite when the sodium compound is $(NaPO_3)_6$.

7. The method of claim 1, wherein the ultrasonicating comprises irradiating an ultrasonic wave with frequency of 20 kHz and energy of 500 W to 700 W for 10 min to 20 min.

8. The method of claim 7, wherein the distilled water or the deionized water is added after the ultrasonic wave is irradiated, such that the slurry has concentration of 0.75 weight % to 1.5 weight %.

9. A method of removing hydrous silica from bentonite, the method comprising:
   performing pretreatment with respect to the bentonite;
   preparing a slurry by putting the bentonite and a sodium compound into distilled water or deionized water;
   ultrasonicating the slurry;
   diluting the ultrasonicated slurry by adding distilled water or deionized water;
   centrifuging the diluted slurry; and
   drying a supernatant obtained through the centrifugation,
   wherein the sodium compound is added with a weight ratio in a range of 0.04 to 0.09 with respect to the bentonite,
   the sodium compound is contained in the slurry at an amount greater than 90% of a cation exchange capacity (CEC) value (meq/100 g) of the bentonite,
   the bentonite comprises Ca-bentonite, and the Ca-bentonite is converted to Na-bentonite using the sodium compound,
   the centrifugation is performed at 10,000 rpm to 12,000 rpm for 30 min.

10. The method of claim 9, the pretreatment comprises a process of drying, scrubbing, levigating, and drying the bentonite.

11. The method of claim 9, wherein the bentonite is contained in the slurry such that the bentonite has a concentration in a range of 3.0 weight % to 9.0 weight %.

12. The method of claim 9, wherein the sodium compound includes one selected from the group consisting of $Na_2CO_3$, $NaHCO_3$ and $(NaPO_3)_6$.

13. The method of claim 9, wherein the ultrasonicatinq comprises irradiating an ultrasonic wave with frequency of 20 kHz and energy of 500 W to 700 W for 10 min to 20 min.

14. The method of claim 13, wherein the distilled water or the deionized water is added after the ultrasonic wave is irradiated, such that the bentonite in the slurry, which is subject to the pretreatment, has concentration of 0.75 weight % to 1.5 weight %.

* * * * *